United States Patent [19]
Kaede

[11] Patent Number: 5,231,529
[45] Date of Patent: Jul. 27, 1993

[54] LIGHT AMPLIFIER FOR MULTI-WAVELENGTH SIGNALS

[75] Inventor: Kazuhisa Kaede, Tokyo, Japan
[73] Assignee: NEC Corporation, Tokyo, Japan
[21] Appl. No.: 811,300
[22] Filed: Dec. 19, 1991
[30] Foreign Application Priority Data
Dec. 19, 1990 [JP] Japan ................. 2-403630
[51] Int. Cl.$^5$ .......................... H01S 2/20; H01L 15/00
[52] U.S. Cl. ...................................... 359/124; 359/589
[58] Field of Search ............... 359/124, 341, 344, 589; 356/352; 358/226; 372/6

[56] References Cited
U.S. PATENT DOCUMENTS

| | | | |
|---|---|---|---|
| 3,792,916 | 2/1974 | Sarna | 359/124 |
| 4,358,851 | 11/1982 | Scifres et al. | 372/6 |
| 4,487,478 | 12/1984 | Jackson | 359/124 |
| 4,707,064 | 11/1987 | Dobrowolski et al. | 358/226 |
| 4,747,673 | 5/1988 | Marrs et al. | 359/589 |
| 4,945,531 | 7/1990 | Suzuki | 359/589 |
| 4,947,134 | 8/1990 | Olsson | 359/344 |

OTHER PUBLICATIONS

Shu Yamamoto, "Long-Haul High-Speed Optical Communication Systems Using a Semiconductor Laser Amplifier", OFC '88, p. 18.

*Primary Examiner*—Nelson Moskowitz
*Attorney, Agent, or Firm*—Sughrue, Mion, Zinn, Macpeak & Seas

[57] ABSTRACT

A multi-wavelength light amplifier comprises a light amplifier for amplifying a wavelength division multiplex signal with accompanying generation of spontaneous emission. An optical coupler is provided for coupling light from the light amplifier to a wavelength filter, such as Fabry-Perot filter. The filter has a plurality of spectral peaks of transmittance and corresponding valleys of reflectance, with the spectral peaks and valleys corresponding respectively to the wavelengths of the multiplex signal. The optical coupler further provides coupling of light reflected from the wavelength filter to an optical sink by which the undesired spontaneous emission is absorbed.

4 Claims, 6 Drawing Sheets

$\lambda 1 \quad \lambda 2 \quad \lambda 3 \quad \lambda 4 \quad \lambda 5 \quad \lambda 6$

WAVELENGTH

LIGHT AMPLIFIER FOR MULTI-WAVELENGTH SIGNALS

BACKGROUND OF THE INVENTION

The present invention relates to a light amplifier.

Recent development of light amplifiers enables direct amplification of light signals, eliminating the need for providing electrooptical and optoelectrical converters at periodic intervals along an optical transmission medium. However, light amplification accompanies spontaneous emission which degrades the quality of a signal being transmitted. To overcome this problem, a prior art approach involves the use of an optical filter such as dielectric multilayered filter having a single narrow passband as described in a paper titled "Long-haul high-speed optical communication systems using a semiconductor laser amplifier", Shu Yamamoto et al, OFC'88, page 18.

One serious problem of the prior art light amplifier is that it cannot be used for amplifying an optical signal in which a plurality of wavelengths are multiplexed.

SUMMARY OF THE INVENTION

It is therefore an object of the present invention to provide a light amplifier that enables amplification of wavelength division multiplex signals.

According to a first aspect of this invention, a multi-wavelength light amplifier comprises a light amplifier for amplifying a wavelength division multiplex signal with accompanying generation of spontaneous emission. An optical coupler is provided for coupling light from the light amplifier to a wavelength filter, such as Fabry-Perot filter, having a plurality of spectral peaks of transmittance and corresponding valleys of reflectance. The wavelength components of the light from the amplifier are passed through the wavelength filter, while the spontaneous emission of the light is reflected from the wavelength filter and passed through the optical coupler to an antireflection means where it is completely absorbed.

According to a second aspect, the multi-wavelength light amplifier comprises a light amplifier for amplifying a wavelength division multiplex signal with accompanying generation of spontaneous emission. A first polarizing filter and a first reflecting plane are arranged in parallel to each other for separating light from the light amplifier by the polarizing filter into a first optical component directed to the first reflecting plane and a second optical component, the first and second components being orthogonally plane polarized with respect to each other. A first quarter wavelength plate receives the first component reflected from the first reflecting plane as well as the second component passing through the first polarizing filter. The first and second components from the first quarter wavelength plate impinge on a wavelength filter having a plurality of spectral peaks of transmittance and corresponding valleys of reflectance. The wavelengths of both components are passed through the filter and through a second quarter wavelength plate to a second polarizing filter as well as to a second reflecting plate which is in parallel therewith, and directed to an output waveguide. Whereas, the spontaneous emission of both optical components are reflected by the filter and pass through the first quarter wavelength plate again and directed to an antireflection means by which the undesired spontaneous emission is absorbed.

According to a third aspect of the present invention, there is provided a bidirectional wavelength amplifier for amplifying each of oppositely propagating wavelength division multiplex signals. The bidirectional wavelength amplifier comprises a first wavelength tap-and-combiner, a second wavelength tap-and-combiner, and a bidirectional light amplifier connected between the first and second wavelength tap-and-combiners for amplifying a wavelength division multiplex signal from each of the first and second wavelength tap-and-combiners with accompanying generation of spontaneous emission. Each of the first and second wavelength tap-and-combiners comprises a first optical element having a first reflecting plane and a first polarizing filter arranged in parallel to the first reflecting plane, and a second optical element having a second reflecting plane and a second polarizing filter arranged in parallel to the second reflecting plane. The first and second optical elements are arranged to form a first optical path between the first reflecting plane and the second polarizing filter and a second optical path between the first polarizing filter and the second reflecting plane. First and second quarter wavelength plates are located in the first and second optical paths and a wavelength filter is disposed between the first and second quarter wavelength plates, the filter having a plurality of spectral peaks of transmittance and corresponding valleys of reflectance. Each of the wavelength division multiplex input signals is applied through a waveguide to the first polarizing plate of the respective wavelength tap-and-combiner and the wavelengths of each signal are applied from the respective tap-and-combiner to a respective terminal of the bidirectional light amplifier. The spontaneous emission of each optical signal is reflected by the filter of the respective tap-and-combiner and led to an antireflection means by which the spontaneous emission is absorbed.

According to a fourth aspect, a bidirectional wavelength amplifier comprises a first light amplifier for amplifying a first wavelength division multiplex signal with accompanying generation of spontaneous emission. To the first light amplifier is connected a first wavelength filter having a plurality of spectral peaks of transmittance and corresponding valleys of reflectance. A second light amplifier is provided for amplifying a second wavelength division multiplex signal with accompanying generation of spontaneous emission. To the second light amplifier is connected a second wavelength filter having a plurality of spectral peaks of transmittance and corresponding valleys of reflectance. A first optical coupler provides the coupling of a first waveguide to the first light amplifier, provides the coupling of the output of the second wavelength filter to the first waveguide, and provides the coupling of light which is reflected from the first wavelength filter and passed through the first light amplifier to a first antireflection means. A second optical coupler provides the coupling of a second waveguide to the second light amplifier, provides the coupling of the output of the first wavelength filter to the second waveguide and provides the coupling of light which is reflected from the second wavelength filter and passed through the second light amplifier to a second antireflection means.

BRIEF DESCRIPTION OF THE DRAWINGS

The present invention will be described in further detail with reference to the accompanying drawings, in which:

FIGS. 5(a) through 5(f) is a spectrum diagram associated with the third embodiment of this invention;

DETAILED DESCRIPTION

Figure 1:
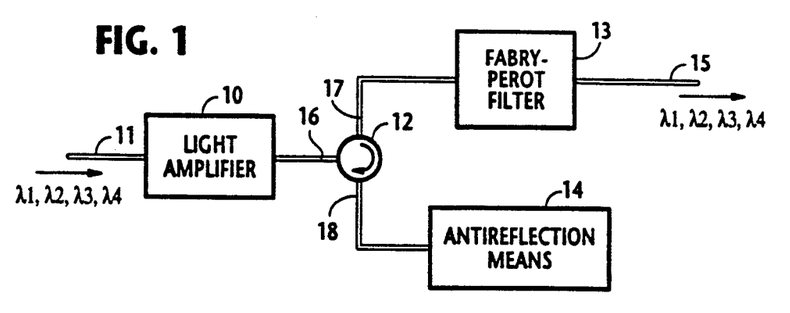
FIG. 1 is a diagrammatic view of a multi-wavelength light amplifier according to a first embodiment of the present invention.

Referring now to FIG. 1, a multi-wavelength amplifier according to a first embodiment of this invention comprises a light amplifier 10, either optical fiber amplifier or semiconductor light amplifier, to which a wavelength division multiplex signal is entered through a fiber optic waveguide 11. As a typical example, the optical input signal has four different wavelength components $\lambda 1$, $\lambda 2$, $\lambda 3$ and $\lambda 4$ which are successively spaced at intervals of 2 nanometers in the neighborhood of 1.55 micrometers. After light amplification, the optical signal inherently contains an undesired component which arises from spontaneous emission generated by the amplifier and spreads over the spectrum as shown in part (a) of FIG. 2. The output of amplifier 10 is applied to an antireflection device 12 which may be implemented by either an optical circulator or an optical isolator having three ports 16, 17 and 18. The amplified signal is entered through the first port 16 and leaves the antireflection device 12 through the second port 17. To the second port 17 of circulator 12 is connected a wavelength filter, or Fabry-Perot filter 13 having a plurality of spectral transmittance peaks successively spaced at 2-nm intervals as shown in part (b) of FIG. 2 corresponding to the wavelength components of the optical signal, and spectral reflectance valleys as shown in part (c) of FIG. 2 corresponding to the wavelength components of the input signal. As a result, all the wavelength components of the optical signal are allowed to pass through wavelength filter 13 to the output waveguide 15 and negligibly small amounts of spontaneous emission are made to appear at the output waveguide 15 as shown in part (d) of FIG. 2.

Figure 2:
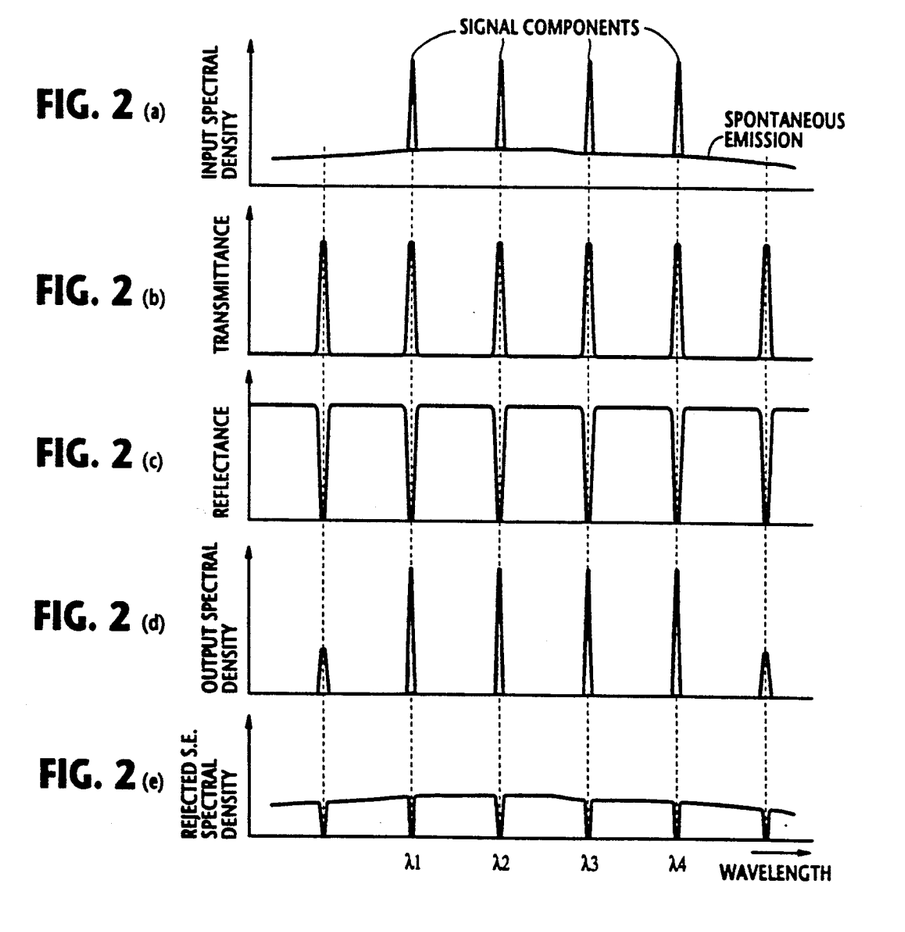
FIGS. 2(a) through 2(e) is a spectrum diagram associated with the first embodiment.

On the other hand, a greater part of the spontaneous emission which is shown in part (e) of FIG. 2 is reflected off the wavelength filter 13 and reenters the circulator 12 through the second port 17 and arrives at the third port 18 which is terminated by an antireflection means or coating 14. Due to the antireflection termination, the energy of undesired spontaneous emission is totally annihilated at port 18. In this way, the individual wavelengths of a multi-wavelength signal travelling in the same direction can be simultaneously amplified without amplifying undesired spontaneous emission.

Figure 3:
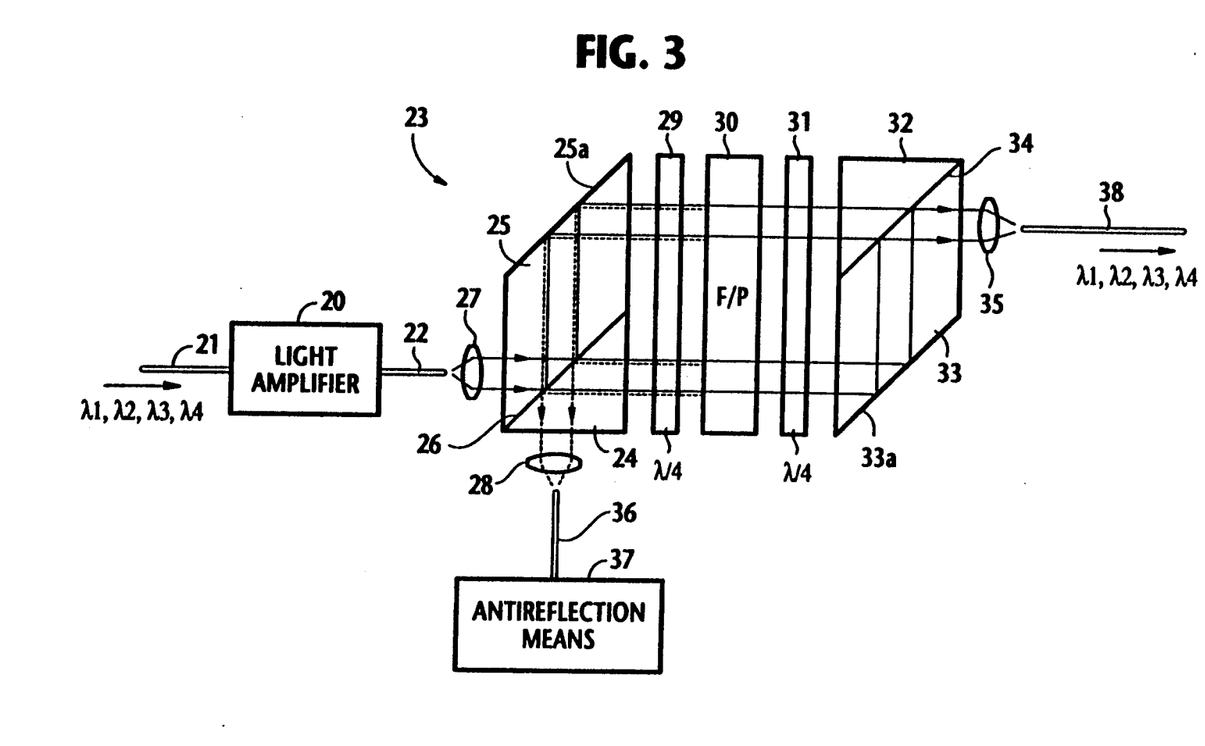
FIG. 3 is a view of a multi-wavelength light amplifier according to a second embodiment of this invention.

A modified embodiment of this invention is shown in FIG. 3. A wavelength multiplex optical signal with components $\lambda 1$, $\lambda 2$, $\lambda 3$ and $\lambda 4$ is applied to a light amplifier 20 through fiber optic waveguide 21, generating undesired spontaneous emission. The output of amplifier 20 is supplied through waveguide 22 to a wavelength tap-and-combiner (WTC) 23. WTC 23 comprises lower and upper prisms 24 and 25 secured together with a polarizing filter 26 interposed therebetween. Upper prism 25 is cut so that it presents a total reflecting plane 25a that is parallel to the plane of polarizing filter 26. The optical signal leaving the output end of waveguide 22 is collimated by a lens 27 into a parallel beam and impinges on the polarizing filter 26, whereupon part of the incident light is reflected upwards and bounces rightwards off the total reflecting plane 25a emerging as a beam having a vertically oriented polarization plane (a plane normal to the plane of the drawing sheet), while the remainder of the light passes through polarizing plane 26 and emerges as a beam having a horizontally oriented polarization plane (a plane parallel to the plane of the drawing sheet). The orthogonally plane polarized, upper and lower beams emerge from prisms 25 and 24 respectively and pass through a quarter wavelength plate 29 so that they acquire a circular polarized state and fall on a Fabry-Perot filter 30 having the same spectral peaks and valleys as those shown in parts (b) and (c) of FIG. 2.

Therefore, the wavelength signals $\lambda 1$, $\lambda 2$, $\lambda 3$ and $\lambda 4$ of the upper and lower beams are allowed to pass through filter 30 and made to be incident on a second quarter wavelength plate 31. As a result, the upper beam emerging from quarter wavelength plate 31 has a horizontally polarized plane and the lower beam has a vertically polarized plane. WTC 23 further includes a second set of an upper prism 32 and a lower prism 33 secured together with a polarizing filter 34 interposed therebetween. Lower prism 33 is cut so that it presents a total reflecting plane 33a that is parallel to the plane of polarizing filter 34. The upper, horizontally plane-polarized light containing the wavelength signals $\lambda 1$, $\lambda 2$, $\lambda 3$, $\lambda 4$ is passed through the polarizing filter 34 and focused by a lens 35 into an output waveguide 38, while the lower, vertically plane-polarized light of the same wavelength signals bounces off the total reflecting plane 33a and is reflected rightwards by the polarizing filter 34 and merges with the upper beam.

On the other hand, the spontaneous emission of the upper and lower beams that are incident on the filter 30 are reflected as indicated by dotted lines in FIG. 3 and pass through the quarter wavelength plate 29 again, giving a further circular polarization so that the spontaneous emission of the upper beam is vertically plane-polarized, and that of the lower beam is horizontally plane-polarized. On their return paths through prisms 25 and 24, the upper beam of the spontaneous emission is reflected off plane 25a downwards and passes through polarizing filter 26 to a focusing lens 28 and the lower beam of the spontaneous emission is reflected by polarizing filter 26 and merges with the upper light in the focusing lens 28 where they are focused onto the input end of a fiber optic waveguide 36 whose output end is terminated by an antireflection means or coating 37.

Figure 4:
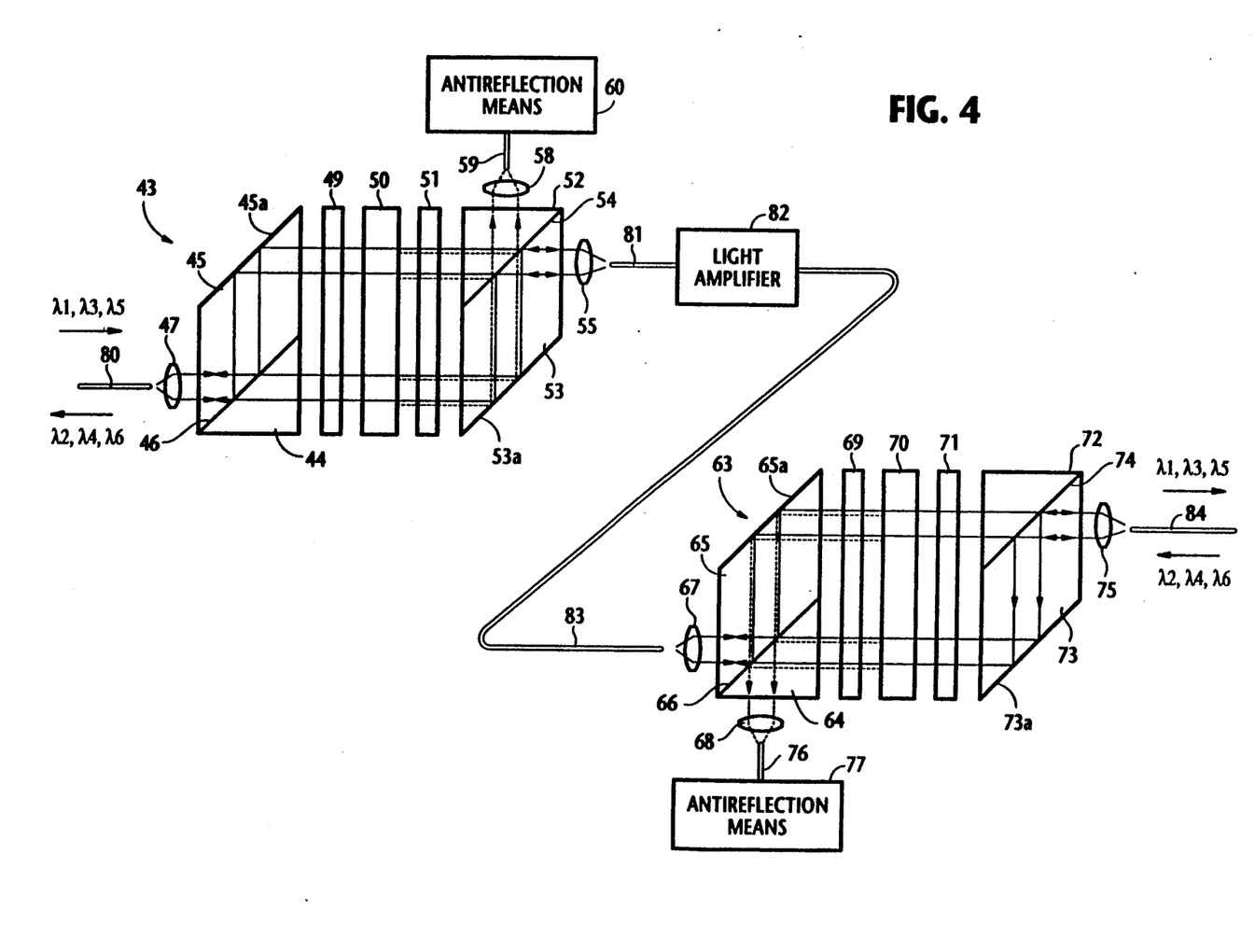
FIG. 4 is a view of a bidirectional light amplifier according to a third embodiment of this invention.

Two wavelength tap-and-combiners can be used to provide a bidirectional wavelength amplifier as shown in FIG. 4. A left-to-right travelling optical signal with wavelengths $\lambda 1$, $\lambda 3$ and $\lambda 5$ containing no spontaneous emission is entered through a fiber optic waveguide 80 to a first wavelength tap-and-combiner 43 and a rightto-left travelling optical signal with wavelengths λ2, λ4 and λ6 containing no spontaneous emission is entered through a fiber optic waveguide 84 to a second wavelength tap-and-combiner 63. Wavelengths λ1, λ3, λ5 are spaced at 4-nm intervals, and wavelengths λ2, λ4, λ6 are likewise spaced at 4-nm intervals, with the wavelengths of the left-to-right signal being spaced at 2-nm intervals with respect to those of the right-to-left signal.

Specifically, the left-to-light optical signal is collimated by a lens 47 and split into two by a polarizing filter 46 interposed between prisms 44 and 45. The light reflecting upwards bounces off total reflection plane 45a to the right and passes through a first quarter wavelength plate 49, a Fabry-Perot filter 50 and a second quarter wavelength plate 51 and a polarizing filter 54 interposed between prisms 52 and 53 to a lens 55 where it is focused onto the input end of a waveguide 81, while the light passing through the polarizing filter 46 propagates through quarter wavelength plate 49, filter 50 and quarter wavelength plate 51, and reflects off the total reflecting plane 53a and then polarizing filter 54 and is entered through waveguide 81 to light amplifier 82. As shown in parts (c) and (d) of FIG. 5, Fabry-Perot filter 50 has spectral peaks and valleys corresponding to all wavelengths of both optical signals.

Figure 5A:
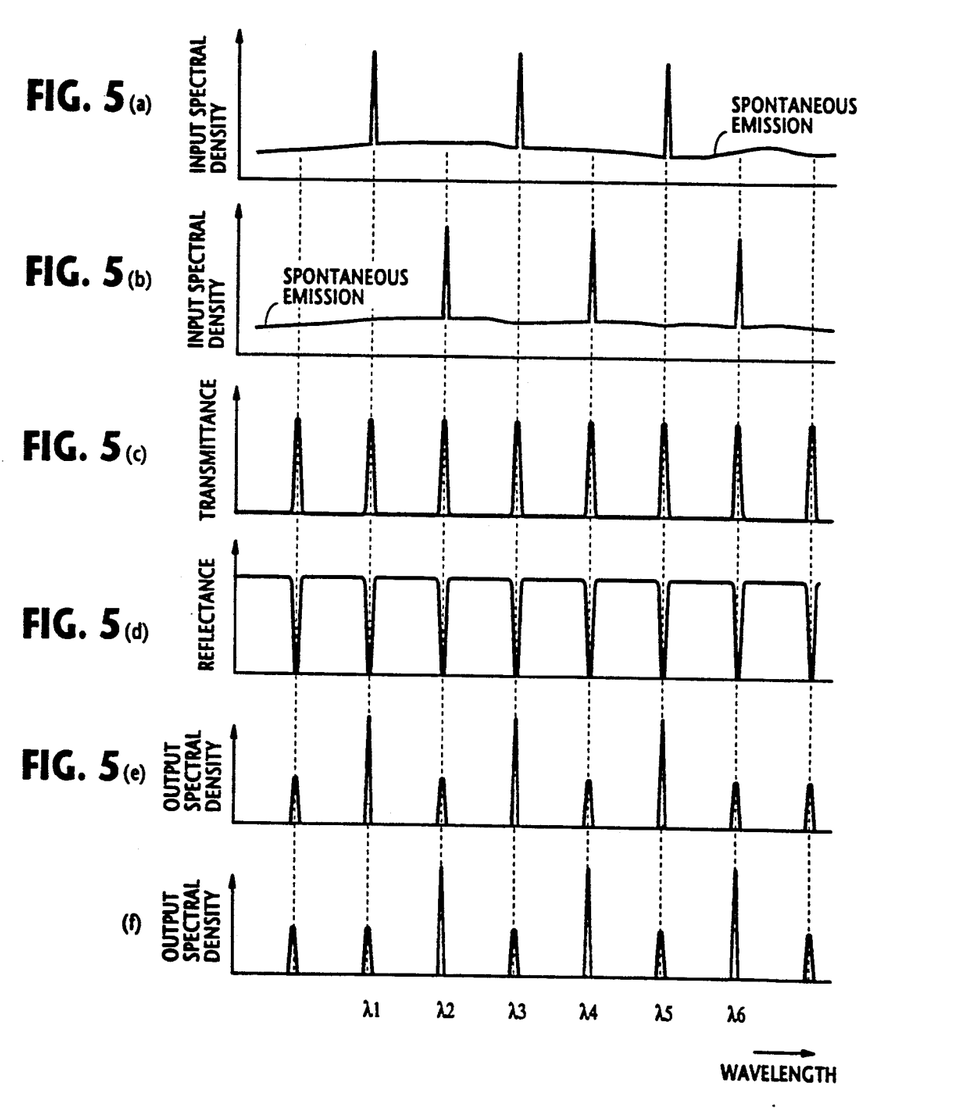

The optical signal entered to the light amplifier 82 through waveguide 81 is amplified with accompanying generation of spontaneous emission as shown in part (a) of FIG. 5. This spontaneous emission is removed by the second WTC 63 by optically coupling the output end of waveguide 83 to a lens 67 by which it is collimated into a parallel beam. This beam is separated into a component following an upward path and a component following a horizontal path by a polarizing filter 66 interposed between prisms 64 and 65. The wavelengths λ1, λ3, λ5 of the upward component are reflected on a plane 65a and propagate through a quarter wavelength plate 69, a Fabry-Perot filter 70 identical to filter 50 and a quarter wavelength filter 71, and pass to a lens 75 through a polarizing filter 74 interposed between prisms 72 and 73, and the same wavelengths of the horizontal component propagate through quarter wavelength plate 69, filter 70 and quarter wavelength filter 71 and reflect on a plane 73a and on polarizing filter 74 to lens 75 by which they are focused onto a waveguide 84. In this way, the wavelength signals λ1, λ3, λ5 are made to appear as shown in part (e) of FIG. 5 at the entry point of the waveguide 84. The spontaneous emissions of both vertical and horizontal components are reflected off the Fabry-Perot filter 70 and trace their return paths to polarizing filter 66 where they are merged together and focused by lens 68 onto a waveguide 76 which is terminated with antireflection means 77.

On the other hand, the right-to-left travelling signal λ2, λ4, λ6 with no spontaneous emission is entered through lens 75 to WTC 63 and separated by polarizing filter 74 into a component tracing a downward path followed by a lower horizontal path and a component tracing an upper horizontal path. Both components propagate through elements 71, 70 and 69 and meet at the polarizing filter 66 where they are combined together into a single beam. This beam is coupled by lens 67 to waveguide 83, amplified by light amplifier 82 and optically coupled by waveguide 81 to lens 55 from which it is directed to polarizing filter 54 and separated into a component tracing a downward path followed by a lower horizontal path and a component tracing an upper horizontal path. Both optical signals now contain components arising from spontaneous emission due to the amplification by amplifier 82 as shown in part (b) of FIG. 5. The signals λ2, λ4 and λ6 of both optical paths are allowed to pass through elements 50 and 49 and meet at polarizing filter 46 where they are combined together into a single beam, which appears as shown in part (f) of FIG. 5, and coupled by lens 47 to waveguide 80. However, the spontaneous emission components of both optical paths are reflected on Fabry-Perot filter 50, returns through quarter wavelength plate 51 and enters through a lens 58 to a waveguide 59 which is terminated by an antireflection means 60.

Figure 6:
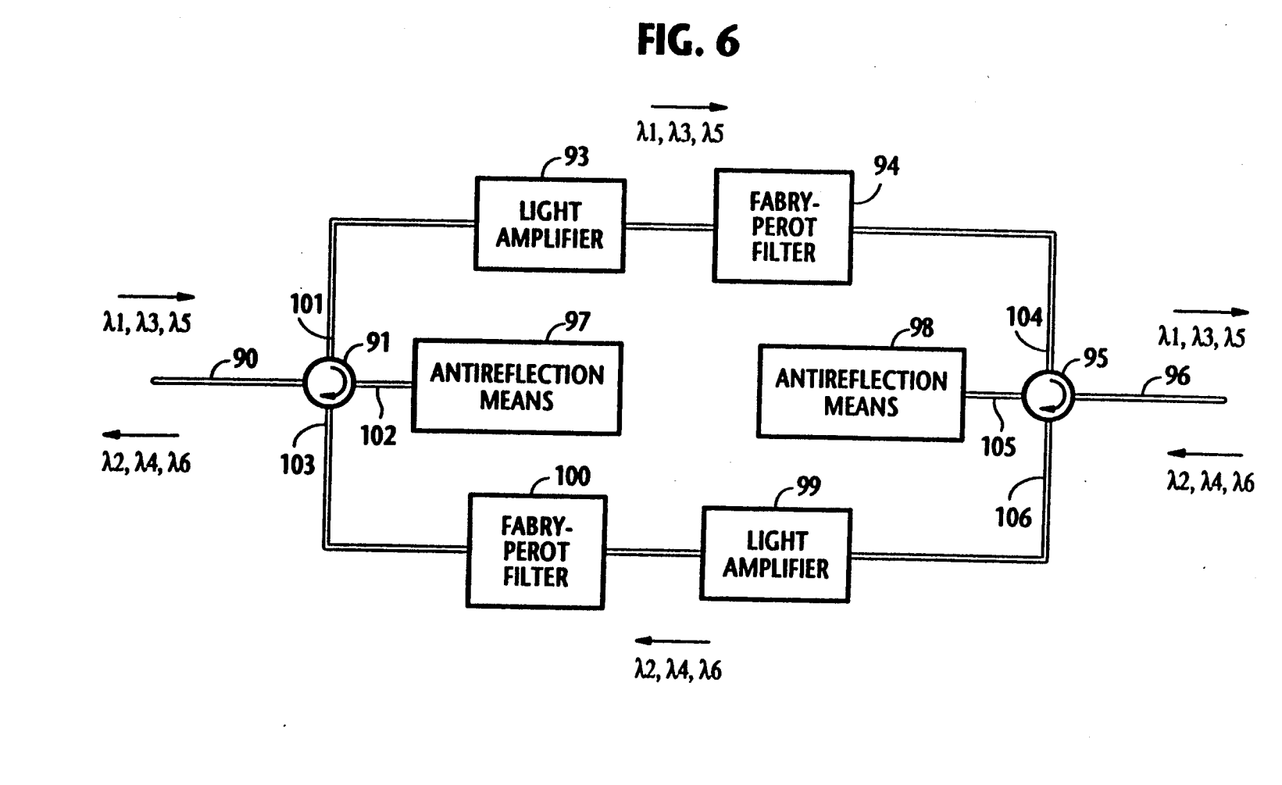
FIG. 6 is a block diagram of a bidirectional light amplifier according to a fourth embodiment of this invention.

A bidirectional light amplifier can also be implemented using two optical circulators as shown in FIG. 6. In this embodiment, a left-to-right travelling multi-wavelength signal with components λ1, λ3, λ5 is entered through waveguide 90 to a first circulator 91, and a right-to-left travelling multi-wavelength signal with components λ2, λ4, λ6 is entered through waveguide 96 to a second circulator 95. As in the previous embodiment, wavelengths λ1, λ3, λ5 are spaced at 4-nm intervals, and wavelengths λ2, λ4, λ6 are likewise spaced at 4-nm intervals, with the wavelengths of the left-to-right signal being spaced at 2-nm intervals with respect to those of the right-to-left signal. Circulator 91 provides unidirectional coupling between waveguides terminating to it; namely, a path from waveguide 90 to 101, a path from waveguide 101 to 102, and a path from waveguide 103 to 90. Likewise, circulator 95 provides a path from waveguide 104 to 96, a path from waveguide 96 to 106, and a path from waveguide 106 to 105.

Figure 7:
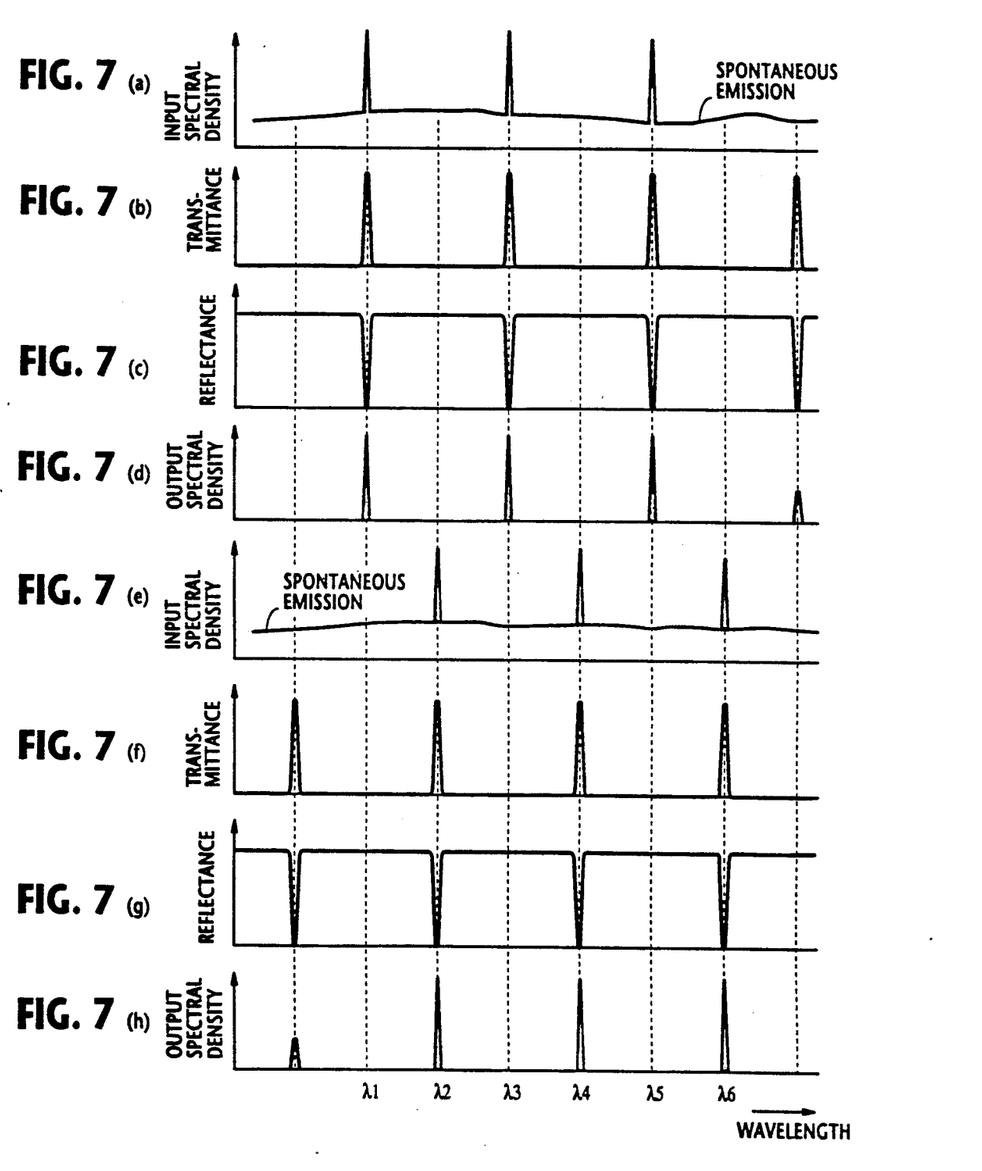
FIGS. 7(a) through (h) is a spectrum diagram associated with the fourth embodiment of this invention.

Waveguide 101 leads to a light amplifier 93 in which the left-to-right travelling signal is amplified with resultant generation of spontaneous emission as shown in part (a) of FIG. 7. The output of amplifier 93 is applied to a Fabry-Perot filter 94 having spectral peaks and valleys spaced at 4-nm intervals corresponding to the wavelengths of the left-to-right signal as shown in parts (b) and (c) of FIG. 7. As a result, the desired wavelength components of the left-to-right signal are allowed to pass through Fabry-Perot filter 94 and waveguide 104 to the second circulator 95 where they are coupled to waveguide 96. On the other hand, the undesired spontaneous emission is reflected by the filter 94 and amplified again by amplifier 93 and applied through waveguide 101 to waveguide 102 which is terminated by an antireflection means 97 for absorption. Thus, the amplified optical signal appearing on waveguide 95 has a spectral density distribution as shown in part (d) of FIG. 7. It is seen that the spontaneous emission is almost annihilated with the exception of a spectral component that is spaced by 4 nanometers from wavelength λ5.

The right-to-left travelling signal, on the other hand, is coupled through waveguide 106 to a light amplifier 99, producing an output having a spectral density distribution as shown in part (e) of FIG. 7. The output of amplifier 99 is coupled to a Fabry-Perot filter 100 having spectral peaks and valleys spaced at 4-nm intervals corresponding to the wavelengths of the right-to-left signal as shown in parts (f) and (g) of FIG. 7. As a result, the desired wavelength components of the left-to-right signal are allowed to pass through Fabry-Perot filter 100 and waveguide 103 to the first circulator 91 where they are coupled to waveguide 90. On the other hand, the resultant spontaneous emission is reflected by Fabry-Perot filter 100 and absorbed by an antireflection means 98 terminating the waveguide 105.

Thus, the amplified optical signal appearing on waveguide 90 has a spectral density distribution as shown in part (h) of FIG. 7. The spontaneous emission of the right-to-left signal is almost annihilated with the exception of a component that is spaced by 4 nanometers from wavelength λ2.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A multi-wavelength light amplifier comprising:
   a light amplifier for amplifying a wavelength division multiplex signal with accompanying generation of spontaneous emission;
   means for forming a first reflecting plane;
   a first polarizing filter arranged in parallel to said first reflecting plane for separating light from said light amplifier into a first component directed to said first reflecting plane and a second component, said first and second components being orthogonally plane polarized with respect to each other;
   a first quarter wavelength plate for receiving said first and second components from said first reflecting plane and said first polarizing filter, respectively;
   a wavelength filter for receiving said first and second components through said first quarter wavelength plate, the filter having a plurality of spectral peaks of transmittance and corresponding valleys of reflectance;
   a second quarter wavelength plate for receiving said first and second components through said wavelength filter;
   a second polarizing filter for directing said first component from the second quarter wavelength plate toward an output waveguide;
   means for forming a second reflecting plane parallel to said second polarizing filter for directing said second component from said second quarter wavelength plate toward said second polarizing filter so that the second component is reflected thereon toward said output waveguide; and
   means optically coupled with said second polarizing filter for absorbing light reflected from said wavelength filter.

2. A multi-wavelength light amplifier as claimed in claim 1, wherein the wavelength filter is a Fabry-Perot filter.

3. A multi-wavelength bidirectional light amplifier comprising:
   a first wavelength tap-and-combiner;
   a second wavelength tap-and-combiner; and
   a bidirectional light amplifier (82) connected between said first and second wavelength tap-and-combiners for amplifying a wavelength division multiplex signal from each of the first and second wavelength tap-and-combiners with accompanying generation of spontaneous emission;
   each of said first and second wavelength tap-and-combiners (43, 63) comprising:
   a first optical element (44, 45; 72, 73) having a first reflecting plane (45a; 73a) and a first polarizing filter (46; 74) arranged in parallel to said first reflecting plane (45a; 73a);
   a second optical element (52, 53; 64, 65) having a second reflecting plane (53a; 65a) and a second polarizing filter (54; 66) arranged in parallel to said second reflecting plane (53a; 65a), and first and second optical elements being arranged to form a first optical path between said first reflecting plane (45a; 73a) and said second polarizing filter (54; 66) and a second optical path between said first polarizing filter (46; 74) and said second reflecting plane (53a; 65a);
   first and second quarter wavelength plates (49; 71, 51; 69) located in said first and second optical paths;
   a wavelength filter (50; 70) disposed between said first and second quarter wavelength plates, the filter having a plurality of spectral peaks of transmittance and corresponding valleys of reflectance;
   first lens means (47; 75) for providing optical coupling between said first polarizing plate (46; 74) and a waveguide (80; 84);
   second lens means (55; 76) for providing optical coupling between said second polarizing filter (54; 66) and said light amplifier (82);
   antireflection means (59, 60; 76, 77); and
   third lens means (58; 68) optically coupled with said second polarizing filter (54; 66) for directing light reflection from said wavelength filter (50; 70) to said antireflection means.

4. A multi-wavelength bidirectional light amplifier as claimed in claim 3, wherein the wavelength filter is a Fabry-Perot filter.

* * * * *